United States Patent
Aravamudan et al.

(10) Patent No.: US 9,799,328 B2
(45) Date of Patent: Oct. 24, 2017

(54) METHOD FOR USING PAUSES DETECTED IN SPEECH INPUT TO ASSIST IN INTERPRETING THE INPUT DURING CONVERSATIONAL INTERACTION FOR INFORMATION RETRIEVAL

(71) Applicant: Veveo, Inc., Andover, MA (US)

(72) Inventors: Murali Aravamudan, Andover, MA (US); Daren Gill, Concord, MA (US); Sashikumar Venkataraman, Andover, MA (US); Vineet Agarwal, Andover, MA (US); Ganesh Ramamoorthy, Salem, NH (US)

(73) Assignee: VEVEO, INC., Andover, MA (US)

( * ) Notice: Subject to any disclaimer, the term of this patent is extended or adjusted under 35 U.S.C. 154(b) by 273 days.

(21) Appl. No.: 13/801,837

(22) Filed: Mar. 13, 2013

(65) Prior Publication Data

US 2014/0039895 A1    Feb. 6, 2014

Related U.S. Application Data

(60) Provisional application No. 61/679,184, filed on Aug. 3, 2012.

(51) Int. Cl.
*G10L 15/00* (2013.01)
*G10L 15/18* (2013.01)
*G10L 15/187* (2013.01)
*G06F 17/30* (2006.01)
*G10L 15/22* (2006.01)

(52) U.S. Cl.
CPC ...... *G10L 15/187* (2013.01); *G06F 17/30743* (2013.01); *G10L 15/1822* (2013.01);
(Continued)

(58) Field of Classification Search
None
See application file for complete search history.

(56) References Cited

U.S. PATENT DOCUMENTS 6,021,403 A * 2/2000 Horvitz et al. ................. 706/45
6,125,345 A    9/2000 Modi et al.
(Continued)

FOREIGN PATENT DOCUMENTS

EP    0242743 A1 * 10/1987 ........... G10L 15/193

OTHER PUBLICATIONS

EP0242743A1.*
(Continued)

*Primary Examiner* — Richard Zhu
(74) *Attorney, Agent, or Firm* — Haley Guiliano LLP

(57) ABSTRACT

A method for using speech disfluencies detected in speech input to assist in interpreting the input is provided. The method includes providing access to a set of content items with metadata describing the content items, and receiving a speech input intended to identify a desired content item. The method further includes detecting a speech disfluency in the speech input and determining a measure of confidence of a user in a portion of the speech input following the speech disfluency. If the confidence measure is lower than a threshold value, the method includes determining an alternative query input based on replacing the portion of the speech input following the speech disfluency with another word or phrase. The method further includes selecting content items based on comparing the speech input, the alternative query input (when the confidence measure is low), and the metadata associated with the content items.

16 Claims, 8 Drawing Sheets

(52) U.S. Cl.
CPC .... *G06F 17/30026* (2013.01); *G10L 15/1815* (2013.01); *G10L 15/22* (2013.01)

(56) References Cited

U.S. PATENT DOCUMENTS

| | | | |
|---|---|---|---|
| 6,236,968 B1 | 5/2001 | Kanevsky et al. | |
| 6,535,850 B1* | 3/2003 | Bayya | 704/239 |
| 6,731,307 B1 | 5/2004 | Strubbe et al. | |
| 6,885,990 B1 | 4/2005 | Ohmori et al. | |
| 7,308,404 B2* | 12/2007 | Venkataraman et al. | 704/255 |
| 7,356,772 B2 | 4/2008 | Brownholtz et al. | |
| 7,461,061 B2 | 12/2008 | Aravamudan et al. | |
| 7,502,737 B2* | 3/2009 | Sharma | 704/251 |
| 7,711,570 B2 | 5/2010 | Galanes et al. | |
| 7,774,294 B2 | 8/2010 | Aravamudan et al. | |
| 7,835,998 B2 | 11/2010 | Aravamudan et al. | |
| 7,895,218 B2 | 2/2011 | Venkataraman et al. | |
| 7,930,168 B2 | 4/2011 | Weng et al. | |
| 7,953,592 B2* | 5/2011 | Kawamura et al. | 704/9 |
| 8,112,454 B2 | 2/2012 | Aravamudan et al. | |
| 8,140,327 B2 | 3/2012 | Kennewick et al. | |
| 8,160,883 B2 | 4/2012 | Lecoeuche | |
| 8,171,087 B2 | 5/2012 | Carrer et al. | |
| 8,172,637 B2 | 5/2012 | Brown | |
| 8,204,751 B1 | 6/2012 | Di Fabbrizio et al. | |
| 8,219,397 B2 | 7/2012 | Jaiswal et al. | |
| 8,229,753 B2 | 7/2012 | Galanes et al. | |
| 8,521,526 B1* | 8/2013 | Lloyd et al. | 704/236 |
| 8,577,671 B1 | 11/2013 | Barve et al. | |
| 8,589,162 B2* | 11/2013 | Lejeune | G10L 15/08 704/251 |
| 2001/0021909 A1 | 9/2001 | Shimomura et al. | |
| 2002/0099542 A1* | 7/2002 | Mitchell et al. | 704/231 |
| 2006/0206326 A1* | 9/2006 | Fukada | G10L 15/187 704/239 |
| 2006/0259473 A1 | 11/2006 | Li et al. | |
| 2007/0078642 A1* | 4/2007 | Weng et al. | 704/4 |
| 2007/0174407 A1 | 7/2007 | Chen et al. | |
| 2007/0226295 A1 | 9/2007 | Haruna et al. | |
| 2008/0046229 A1 | 2/2008 | Maskey et al. | |
| 2008/0109741 A1 | 5/2008 | Messing et al. | |
| 2008/0195387 A1* | 8/2008 | Zigel et al. | 704/236 |
| 2008/0240379 A1 | 10/2008 | Maislos et al. | |
| 2008/0270138 A1* | 10/2008 | Knight et al. | 704/260 |
| 2009/0106375 A1 | 4/2009 | Carmel et al. | |
| 2009/0306979 A1 | 12/2009 | Jaiswal et al. | |
| 2009/0319917 A1 | 12/2009 | Fuchs et al. | |
| 2010/0002685 A1 | 1/2010 | Shaham et al. | |
| 2010/0286979 A1* | 11/2010 | Zangvil | G06F 17/273 704/9 |
| 2011/0010316 A1 | 1/2011 | Hamilton, II et al. | |
| 2011/0040554 A1 | 2/2011 | Audhkhasi et al. | |
| 2011/0145847 A1 | 6/2011 | Barve et al. | |
| 2011/0195696 A1 | 8/2011 | Fogel et al. | |
| 2011/0212428 A1 | 9/2011 | Baker | |
| 2011/0213610 A1* | 9/2011 | Chen | G06F 17/2715 704/9 |
| 2012/0022872 A1 | 1/2012 | Gruber et al. | |
| 2012/0023175 A1 | 1/2012 | DeLuca | |
| 2012/0101806 A1* | 4/2012 | Davis et al. | 704/9 |
| 2014/0012581 A1* | 1/2014 | Ganong, III | G10L 15/08 704/257 |
| 2014/0025705 A1 | 1/2014 | Barve et al. | |
| 2014/0222433 A1* | 8/2014 | Govrin et al. | 704/260 |
| 2015/0058013 A1* | 2/2015 | Pakhomov | G10L 25/78 704/243 |

OTHER PUBLICATIONS

"Dialogue Systems: Multi-Modal Conversational Interfaces for activity based dialogues," (4 pages, retrieved Apr. 4, 2013) http://godel.stanford.edu/old/witas/ <https://webmail.veveo.net/exchweb/bin/redir.asp?URL=http://godel.stanford.edu/old/witas/>.

Acomb, K. et al., "Technical Support Dialog Systems: Issues, Problems and Solutions," Bridging the Gap: Academic and Industrial Research in Dialog Technologies Workshop Proceedings, pp. 25-31, NAACL-HLT, Rochester, NY, Apr. 2007. c2007 Association for Computational Linguistics.

Balchandran, R. et al., "A Multi-modal Spoken Dialog System for Interactive TV," ICMI'08; pp. 191-192 (Oct. 20-22, 2008).

Baldwin, et al., "Autonomous Self-Assessment of Autocorrections: Exploring Text Message Dialogues," 2012 Conf. of the N. Amer. Chapter of Computational Linguistics: Human Language Technologies, pp. 710-719 (2012).

Bennacef, et al., "A Spoken Language System for Information Retrieval," Proc. ICSLP 1994, 4 pages (Sep. 1994).

Bimbot, et al., "Variable-length Sequence Modeling: Multigrams," IEEE Signal Proc. Letters, vol. 2, No. 6, Jun. 1995 (3 pgs.).

Bocchieri, et al., "Understanding Spontaneous Speech," http://ww-wthepieraccinis.com/publications/1995/AIIA_95.pdf, Journal of the Italian Assoc of Artificial Intelligence, Sep. 1995 (5 pgs.).

Bonneau-Maynard, et al., "Dialog Strategies in a tourist information spoken dialog system," SPECOM '98, Saint Petersburgh, pp. 115-118 (1998).

Carpenter, et al., "A Portable, Server-Side Dialog Framework for VoiceXML," Proc of ICSLP2002, Denver (CO), Sep. 16-20, 2002 (5 pgs.).

Caskey, et al., "Interactive Grammar Inference with Finite State Transducers," ASRU '03 Workshop on Automatic Speech Recognition and Understanding, St. Thomas, USVI, Nov. 30-Dec. 4, 2003 (IEEE) pp. 572-576.

"City browser: developing a conversational automotive HMI," CHI 2009 ~ Spotlight on Works in Progress ~ Session 2, Boston, MA, USA, Apr. 4-9, 2009. pp. 4291-4296 ISBN: 978-1-60558-247-4 10.1145/1520340.1520655.<http://dl.acm.org/citation.cfm?id=1520655>.

Eckert, et al., "User Modeling for Spoken Dialogue System Evaluation," <http://www.thepieraccinis.com/publications/1997/ASRU.sub.--97.sub.--u- ser.pdf> ASRU '97, 1997 (pp. 80-87).

Hakimov, et al., "Named entity recognition and disambiguation using linked data and graph-based centrality scoring," SWIM '12 Proceedings of the 4th International Workshop on Semantic Web Information Management Article No. 4 ACM New York, NY, USA. 7 pgs.

Ibrahim, A., et al., "Multimodal Dialogue Systems for Interactive TV Applications," (6 pages, date not available) http://www.google.co.in/search?sugexp=chrome,mod=11&sourceid=chrome&ie=UTF-8&q=Multimodal+Dialogue+Systems+for+Interactive+TVApplications#hl=en&sa=X&ei=xs_qT6vll4HXrQfk_93UBQ&ved=0CE8QvwUoAQ&q=Multimodal+Dialogue+Systems+for+Interactive+TV+Applications&spell=1&bav=on.2,or.r_gc.r_pw.r_qf.,cf.osb&fp=d70cb7a1447ca32b&biw=1024&bih=667.

International Search Report and Written Opinion issued by The U.S. Patent and Trademark Office as International Searching Authority for corresponding International Application No. PCT/US13/053457 mailed Feb. 20, 2014 (18 pgs.).

Jung, et al., "Using Utterance and Semantic Level Confidence for Interactive Spoken Dialog Clarification," J. Comp. Sci. Eng., vol. 2(1): 1-25 (Mar. 2008).

Karanastasi, et al., "A Natural Language Model and a System for Managing TV—Anytime Information from Mobile Devices," (12 pgs., date not available) http://pdf.aminer.org/000/518/459/a_natural_language_model_and_a_system_for_managing_tv.pdf.

Lee, et al., "Combining Acoustic and Language Information for Emotion Recognition," Proc of ICSLP 2002, Denver (CO), Sep. 16-20, 2002. 5 pgs.

Lee, et al., "Subword-based large vocabulary speech recognition," AT&T Tech. Journal, vol. 72, No. 5, Sep./Oct. 1993, pp. 25-36, Total 14 pgs.

Levin, et al., "A stochastic model of computer-human interaction for learning dialogue, strategies," ESCA, Eurospeech 97, Rhodes, Greece, ISSN 1018-4074, Sep. 1997. 5 pgs.

Levin, et al., "CHRONUS, the next generation," Proc. 1995 ARPA Spoken Language Systems Tech. Workshop, Austin, Texas, Jan. 22-25, 1995 (4 pgs.).

(56) References Cited

OTHER PUBLICATIONS

Levin, et al., "Concept-based spontaneous speech understanding system," Eurospeech, 4th European Conference of Speech Communication and Technology, Madrid, Spain,1995 (4 pgs.).

Levin, et al., "Using Markov decision process for learning dialogue strategies," Proc. ICASSP 98, Seattle, WA, May 1998 (p. 201-204).

Meng, et al., "The Use of Belief Networks for Mixed-Initiative Dialog Modeling," IEEE Transactions on Speech and Audio Processing, vol. 11, No. 6, pp. 757-773, Nov. 2003.

Paek, T., et al., "Automating spoken dialogue management design using machine learning: An industry perspective," Speech Communication, vol. 50, 2008, pp. 716-729.

Pieraccini, et al., "Spoken Language Communication with Machines: the Long and Winding Road from Research to Business," in M. Ali and F. Esposito (Eds) : IEA/AIE 2005,LNAI 3533, pp. 6-15, 2005, Springer-Verlag.

Pieraccini, et al., "A Learning Approach to Natural Language Understanding," Speech Recognition and Coding, Springer-Verlag,Bubion (Granada), Spain, 1993 (21 pgs.).

Pieraccini, et al., "A spontaneous-speech understanding system for database query applications," ESCA Workshop on Spoken Dialogue Systems—Theories & Applications, Vigso, Denmark, Jun. 1995 (4 pgs.).

Pieraccini, et al., "Stochastic representation of semantic structure for speech understanding," Speech Comm., vol. 11 (1992) pp. 283-288.

Pieraccini, et al., "Algorithms for speech data reduction & recognition," Esprit 85 Status Report of Continuing Work, Proc. of 2nd Esprit Technical Week, Brussels, Sep. 1985 (14 pages).

Pieraccini, et al., "Where do we go from here? Research and Commercial Spoken Dialog Systems," Recent Trends in Discourse and Dialog, Lisbon, Portugal, Sep. 2-3, 2005. pp. 1-10 as printed in Springer Sci. and Bus. Media, 2008. Total 26 pgs.

Pieraccini, et al., "Multi-modal Spoken Dialog with Wireless Devices," Proc. of ISCA Tutorial and Research Workshop—Multimodal Dialog in Mobile Environments—Jun. 17-19, 2002—Kloster Irsee, Germany as printed in Text, Speech and Language Tech., vol. 28, 2005. pp. 169-184.

Pieraccini, et al., "Etude, a Recursive Dialog Manager with Embedded User Interface Patterns," Proc. of ASRU01—IEEE Workshop, Madonna di Campiglio, Italy, Dec. 2001 as printed in IEEE, 2002, pp. 244-247.

Pieraccini, et al., "Multimodal Conversational Systems for Automobiles," Communications of the ACM, Jan. 2004, vol. 47, No. 1, pp. 47-49.

Pieraccini, et al., "A Multimodal Conversational Interface for a Concept Vehicle," <http://www.thepieraccinis.com/publications/2003/Eurospeech.sub.--03.pdf>, Eurospeech2003., Geneva (Switzerland), Sep. 2003 (4 pgs.).

Pieraccini, et al., "Automatic learning in spoken language understanding," <http://www.thepieraccinis.com/publications/1992/ICSLP.sub.--92.pdf>->, Proc. 1992 International Conference on Spoken Language Processing (ICSLP), Banff, Alberta, Canada, Oct. 1992, pp. 405-408.

Pieraccini, et al., "AMICA: the AT&T Mixed Initiative Conversational Architecture," Proc. of Eurospeech 97, Rhodes, Greece, Sep. 1997 (5 pgs.).

Pieraccini, et al., "Learning how to understand language," <http://www.thepieraccinis.com/publications/1993/Eurospeech.s- ub.--93.sub.--Keynote.pdf>, Proc. Eurospeech '93, Berlin, Germany, Sep. 1993, pp. 1407-1412.

Pieraccini, et al., "Spoken Language Dialog: Architectures and Algorithms," Proc. of XXIIemes Journees d'Etude sur la Parole, Martigny (Switzerland), Jun. 1998, 21 pgs.

Pieraccini, R., "The Industry of Spoken-Dialog Systems and the Third Generation of Interactive Applications," in Speech Technology: Theory and Applications, F. Chen and K.Jokinen, editors, Springer, 2010, pp. 61-78.

Pieraccini, et al., "Are We There Yet? Research in Commercial Spoken Dialog Systems," in Text, Speech and Dialogue, 12th International Conference, TSD 2009, Pilsen, Czech Republic, Sep. 2009, Vaclav Matousek and Pavel Mautner (Eds): pp. 3:13.

Riccardi, et al., "Non deterministic stochastic language models for speech recognition," ICASSP '95, Detroit, 1995, pp. 237-240.

Rooney, B. "AI System Automates Consumer Gripes," Jun. 20, 2012; (2 pgs.; <http://blogs.wsj.com/tech-europe/2012/06/20/ai-system-automates-consu- mer-complaints/>.

Roush, W. "Meet Siri's Little Sister, Lola. She's Training for a Bank Job," (Jun. 27, 2012) (4 pages) http://www.xconomy.com/san-francisco/2012/06/27/meet-siris-little-sister-lola-shes-training-for-a-bank-job/?single_page=true <https://webmail.veveo.net/exchweb/bin/redir.asp?URL=http://www.xconomy.com/san-francisco/2012/06/27/meet-siris-little-sister-lola-shes-training-for-a-bank-job/?single_page=true>.

Rudnicky, A. et al., "An Agenda-Based Dialog Management Architecture for Spoken Language Systems," School of Computer Science, Carnegie Mellon University, Pittsburgh, PA 15213 (4 pages, date not available).

Smart, J. "The Conversational Interface: Our Next Great Leap Forward (aka Conversational User Interface, Linguistic UI, Natural UI, Spoken Dialog System, etc.)," (18 pages, Retrieved Apr. 4, 2013) http://www.accelerationwatch.com/lui.html <https://webmail.veveo.net/exchweb/bin/redir.asp?URL=http://www.accelerationwatch.com/lui.html>.

Suendermann, et al., "From Rule-Based to Statistical Grammars: Continuous Improvement of Large-Scale Spoken Dialog Systems," <http://www.thepieraccinis.com/publications/2009/ICASSP.sub.--2009.pdf- >, Proceedings of the 2009 IEEE Conference on Acoustics, Speech and Signal Processing (ICASSP 2009), Taipei, Taiwan, Apr. 19-24, 2009 (IEEE). 4 pgs.

Suendermann, et al., "Contender," <http://www.thepieraccinis.com/publications/2010/sit2010.sub.--2010072- 4.pdf>. In Proc. of the SLT 2010, IEEE Workshop on Spoken Language Technology, Berkeley, USA, Dec. 2010 (IEEE), 6 pgs.

Suendermann, et al., "Large-Scale Experiments on Data-Driven Design of Commercial Spoken Dialog Systems," <http://www.thepieraccinis.com/publications/2011/interspeech.s-ub.--201104012.pdf>. In Proc.of the Interspeech 2011, 12th Annual Conference of the International Speech Communication Association, Florence, Italy, Aug. 2011 (4 pgs.).

Suendermann, D., et al., "Localization of Speech Recognition in Spoken Dialog Systems: How Machine Translation Can Make Our Lives Easier," <http://www.thepieraccinis.com/publications/2009/Interspeech2009.pdf&g-t;, Proceeding of the 2009 Interspeech Conference, Sep. 6-10, 2009, Brighton, UK. (4 pgs.).

Suendermann, et al., "SLU in Commercial and Research Spoken Dialogue Systems," in Spoken Language Understanding, Systems for Extracting Semantic Information from Speech, G. Tur and R. De Mori, editors, John Wiley &Sons, Ltd., 2011, pp. 171-194.

Vidal, E., et al., "Learning associations between grammars: A new approach to natural language understanding," Proc. Eurospeech '93,Berlin, Germany, Sep. 1993, pp. 1187-1190.

Xu, Y., et al., "Dialogue Management Based on Entities and Constraints," Proc. SIGDIAL 2010: the 11th Ann. Meeting of the Special Interest Group on Discourse and Dialog, pp. 87-90: 2010.

Jack, et al., "Preferences and Whims: Personalised Information Retrieval on Structured Data and Knowledge Management," http://www.mendeley.com/profiles/kris-jack/publications/Report>/, 2 pgs.

* cited by examiner

FIG. 1

Conversation Interaction Architecture

METHOD FOR USING PAUSES DETECTED IN SPEECH INPUT TO ASSIST IN INTERPRETING THE INPUT DURING CONVERSATIONAL INTERACTION FOR INFORMATION RETRIEVAL

CROSS-REFERENCE TO RELATED APPLICATIONS

This application claims the benefit under 35 U.S.C. §119 (e) to U.S. Provisional Patent Application No. 61/679,184 entitled Method for Using Pauses Detected in Speech Input to Assist in Interpreting the Input During Conversational Interaction for Information Retrieval, filed on Aug. 3, 2012, the contents of each of which are incorporated by reference herein.

BACKGROUND OF THE INVENTION

Field of Invention

The present invention relates to systems and methods for assisting a user in retrieving information using a conversational interface, and, more specifically, related to techniques of using speech disfluencies during speech input to assist in interpreting the input.

Description of Related Art and Context of the Invention

Almost all languages (at least the modern era versions of them) have a repertoire of punctuation marks to disambiguate the meaning of sentences and to imbue them with emotion (the emergence of emoticons further adds to this repertoire). Expression of intent for information retrieval by written text can tap into this repertoire, particularly for demarcating title and phrase boundaries. It is not uncommon for even an average search engine user to demarcate titles or phrases with quotation marks, in search inputs, to disambiguate and retrieve desired results optimally. Punctuation marks serve, in many instances, to completely change the semantic interpretation of a sentence. For instance, as FIGS. 1 and 2 show, a parser outputs different parse trees, and ascribes different meaning to terms by the presence of quotation marks.

Expression of intent for information retrieval by speech, however, has just a couple of choices available to augment speech—intonation and pauses (facial expressions and gesticulations are only meaningful when listener has viewing capability too). While intonation is very effective for expression of mood or user's subjective state, it may not be an effective speech augmentation for information retrieval when the listener is a machine and not a human. Although some responsive IVR (interactive voice response) systems may detect drastic changes in intonation, pitch increase in particular, as a cue to promptly delegate further interaction with the irked customer to a human representative, this technique does not involve inferring user's expression of intent.

One remaining analog for punctuations in speech input in information retrieval are pauses or short periods of silence within a sentence. Perhaps it is the very paucity of "punctuation equivalent" options in speech that have led humans, in languages such as the English language, to devise additions to a pause, where the additive words/phrases accompanying the pause are interspersed within the sentence. For instance, a journalist reporting on a speech by a politician, would speak, "Mr. X responded to the mounting accusations and I quote<pause> these accusations have no basis . . . <pause>end quote". If the same sentence was reported in writing, the journalist would have just written—in response to the mounting accusations Mr. X said, "These accusations have no basis . . . ".

BRIEF SUMMARY OF ASPECTS OF THE INVENTION

Expression of intent for information retrieval by written text affords the luxury of pausing for any length of time, within the very composition of the intent to formulate the expression of the intent. Speech, in stark contrast, doesn't afford that luxury of pausing indefinitely mid sentence—inordinately long pauses would be construed to be pathological. However, humans do pause in mid sentence, for short periods, either for cognitive recall of a word or phrase, or to formulate a sentence. These pauses are of relatively short duration. Typically these pauses are made to appear short by subconsciously filling time with auditory fillers. Examples of auditory time fillers are lingering on the last syllable of the word preceding the pause or by making filler sounds ("hmm", "uh," "um," "eh," "well" etc.). The younger generation, in particular, resort to excessive use of time filler words such as "like" to accompany pauses in sentences, to the constant consternation of parents who like articulate exchanges. In summary, applicants have discovered that this usage of speech disfluencies (e.g., pauses and auditory time fillers), is a clear indicator of cognitive latencies in word/phrase recall or sentence construction. Moreover, the pathological case of stammer (which can perhaps be distinguished by its frequency and possible periodicity), and the "inarticulate malady" mostly afflicting the young, where noise words such as "like" accompany pauses, and abound in a single sentence can be detected and dealt with in a separate manner.

When user pauses during expression of intent for information retrieval using text input, modern information retrieval systems assist user by word/phrase suggestions or directly by providing results (see, for example, U.S. Pat. No. 7,895,218). When we engage in conversations, it is natural for a participant to complete or fill in a word or phrase when another pauses to recall it. Such active interjection is one of the several key attributes of a natural conversation between humans. A system that even offers passive assistance when user engages in a pause that is cognitive recall latency, would be of great value to the user.

The current state of speech recognition is still at its infancy in comparison to the ease with which humans converse with each other. Users often tend to mentally prepare themselves, formulating what they are about to speak, before talking to conversational engines. The speech disfluencies that are still present even after such mental preparation are high value information in regard to their demarcation of phrase or title boundaries. As speech recognition engines improve, the comfort level in speaking to machines would increase too, and over time, humans may speak to machines with the same level of inaccuracy or relaxed expression that they would with other humans. The interpretation of speech disfluencies, hence, becomes even more important as conversational systems improve; since the nuances of information in speech disfluencies (hesitation to utter something) is only bound to increase, as conversation exchanges approach the level of inter person conversations.

There are conversational systems that are always "on" and listening to user input, where, for example, user would address the conversation engine before speaking to it (just as one calls out a person's name before speaking). However, most conversational systems give user the control to explicitly indicate when user is speaking or has stopped speaking. There are several reasons for this, such as the confusions arising from improperly hearing ambient noise as commands, battery power consumption etc. The ability to explicitly control when to listen to user's input and when to stop listening is typically a user interface element, implemented in hardware or software. The problem with such a system, however, is that user may turn on listening after user starts speaking, or turn off listening before user stops speaking—a simple consequence of minor muscular coordination sequencing errors between hand and utterance start/completion by vocal chords. This error manifests in the clipping of user input at the beginning and at the end. Recognizing the absence of silence or pause at the beginning and ending of users speech input, as an indicator of clipping, is expected to help recognition engines in compensating for the clipping.

In summary, embodiments of the present invention treat a pause (a short period of silence where user is not speaking), in speech input within sentences, equivalent to punctuations in written input, and uses them to demarcate title and phrase boundaries. Furthermore, in some implementations, the presence of pauses at certain points in speech input is used to score the confidence of the user in that portion of the input. In situations where it is possible to accurately predict what user was trying to recall or formulate, some embodiments of the invention assist the user, passively (e.g. text suggestions) or actively (auditory interjection), and help user in the formulation of the intent. Optionally, the system may have the response matching the suggested formulation along with the assistance provided to formulate the question. Some embodiments use the absence of pause before and/or after speech input to infer that user input is being clipped at the beginning and ending, respectively, and the method described in the present disclosure compensates for those clippings.

SUMMARY OF THE INVENTION

In an embodiment of the invention, a method for using speech disfluencies detected in speech input to assist in interpreting the input is provided. The method includes providing access to a set of content items. Each of the content items is associated with metadata that describes the corresponding content item. The method also includes receiving a speech input from a user, the input intended by the user to identify at least one desired content item. The method further includes detecting a speech disfluency in the speech input and determining a measure of confidence of the user in a portion of the speech input following the speech disfluency. The method also includes, upon a condition in which the confidence measure does not exceed a threshold value, determining an alternative query input based on replacing the portion of the speech input following the speech disfluency with another word or phrase and selecting a subset of content items from the set of content items based on comparing the speech input, the alternative query input, and the metadata associated with the subset of content items. The method includes, upon a condition in which the confidence measure exceeds a threshold value, selecting a subset of content items from the set of content items based on comparing the speech input and the metadata associated with the subset of content items. The method also includes presenting the subset of content items to the user.

In another embodiment, the method further includes measuring duration of the speech disfluency. The determination of the confidence measure can be based on the duration of the speech disfluency. Alternatively, the determination of the confidence measure can based on a subset of content items.

In another embodiment, the method includes offering assistance when the user engages in a speech disfluency. The assistance can be inferring a word or phrase following the speech disfluency and presenting the word or phrase to the user.

In yet another embodiment, the speech disfluency is a pause or an auditory time filler.

In a further embodiment, the method includes providing a user preference signature describing preferences of the user for at least one of (i) particular content items and (ii) metadata associated with the content items. Each of the content items is associated with metadata that describes the corresponding content items and wherein the word or phrase to be replaced for the uncertain portion is selected based on the user preference signature.

In a different embodiment, a method for using speech disfluencies detected in speech input to assist in interpreting the input is provided. The method includes providing access to a set of content items, wherein each of the content items is associated with metadata that describes the corresponding content item. The method also includes receiving a speech input from a user intended to identify at least one desired content item, detecting a speech disfluency in the speech input, and determining an alternative query input based on replacing the portion of the speech input following the speech disfluency with another word or phrase. The method further includes selecting a subset of content items from the set of content items based on comparing the speech input, the alternative query input, and the metadata associated with the subset of content items. The method also includes presenting the subset of content items to the user.

In another embodiment, a method for using speech disfluencies detected in speech input to assist in interpreting the input is provided. The method includes providing access to a set of content items. Each of the content items is associated with metadata that describes the corresponding content item. The method also includes receiving a speech input from a user intended to identify at least one desired content item, detecting a pause in the speech input, and selecting a subset of content items based on comparing the speech input and the metadata associated with the subset of content items. The method also includes presenting the subset of content items to the user. The selection process gives a higher weight to a portion of the speech input following the pause than other portions of the speech input.

In yet another embodiment, the method includes inferring that the portion of the speech input following the pause is a title or a common phrase.

In another embodiment, a method for using speech disfluencies detected in speech input to assist in interpreting the input is provided. The method includes providing access to a set of content items, where each of the content items is associated with metadata that describes the corresponding content item. The method also includes receiving a speech input from a user intended to identify at least one desired content item and detecting at least one of front-end clipping and tail-end clipping. The method further includes constructing a plurality of query inputs using at least one of words that matches a first part of a last word of the speech input and words that matches a later part of a first word of the speech input, selecting a subset of content items from the set of content items based on comparing the plurality of query inputs and the metadata associated with the subset of content items, and presenting the subset of content items to the user. The front-end clipping is detected based on an absence of pause in a beginning of the speech input and the tail-end clipping is detected based on an absence of pause in an end of the speech input. The words that matches the first part of the last word is used when tail-end clipping is detected and the words that matches the later part of the first word is used when front-end clipping is detected.

In a further embodiment, a system for using speech disfluencies detected in speech input to assist in interpreting the input is provided. The system includes computer readable instructions encoded on a non-transitory computer readable medium. The computer readable instructions cause a computer system to provide access to a set of content items. Each of the content items is associated with metadata that describes the corresponding content item. The computer readable instructions also cause a computer system to receive a speech input from a user intended to identify at least one desired content item, detect a speech disfluency in the speech input, and determine a measure of confidence of the user in a portion of the speech input following the speech disfluency. The computer readable instructions also cause a computer system to, upon a condition in which the confidence measure does not exceed a threshold value, determine an alternative query input based on replacing the portion of the speech input following the speech disfluency with another word or phrase and select a subset of content items from the set of content items based on comparing the speech input, the alternative query input, and the metadata associated with the subset of content items. The computer readable instructions further cause a computer system to, upon a condition in which the confidence measure exceeds a threshold value, select a subset of content items from the set of content items based on comparing the speech input and the metadata associated with the subset of content items. The computer readable instructions also cause a computer system to present the subset of content items to the user.

In a further embodiment, a system for using speech disfluencies detected in speech input to assist in interpreting the input is provided. The system includes computer readable instructions encoded on a non-transitory computer readable medium. The computer readable instructions cause a computer system to provide access to a set of content items. Each of the content items is associated with metadata that describes the corresponding content item. The computer readable instructions cause a computer system to receive a speech input from a user intended to identify at least one desired content item, detect a pause in the speech input, select a subset of content items based on comparing the speech input and the metadata associated with the subset of content items, and present the subset of content items to the user. The selection process gives a higher weight to a portion of the speech input following the pause than other portions of the speech input.

In another embodiment, a system for using speech disfluencies detected in speech input to assist in interpreting the input is provided. The system includes computer readable instructions encoded on a non-transitory computer readable medium. The computer readable instructions causes a computer system to provide access to a set of content items. Each of the content items being associated with metadata that describes the corresponding content item. The computer readable instructions also causes the computer system to receive a speech input from a user intended by the user to identify at least one desired content item, detect at least one of front-end clipping and tail-end clipping, and construct a plurality of query inputs using at least one of words that matches a first part of a last word of the speech input and words that matches a later part of a first word of the speech input. The computer readable instructions also causes the computer system to select a subset of content items from the set of content items based on comparing the plurality of query inputs and the metadata associated with the subset of content items and present the subset of content items to the user. The front-end clipping is detected based on an absence of pause in a beginning of the speech input and the tail-end clipping is detected based on an absence of pause in an end of the speech input. The words that matches the first part of the last word is used when tail-end clipping is detected and the words that matches the later part of the first word is used when front-end clipping is detected.

BRIEF DESCRIPTION OF THE DRAWINGS

For a more complete understanding of various embodiments of the present invention, reference is now made to the following descriptions taken in connection with the accompanying drawings in which:

FIG. 1 illustrates a parser output when dealing with lack of punctuation.

DETAILED DESCRIPTION OF THE PREFERRED EMBODIMENTS

Conversational System Architecture

Figure 2:
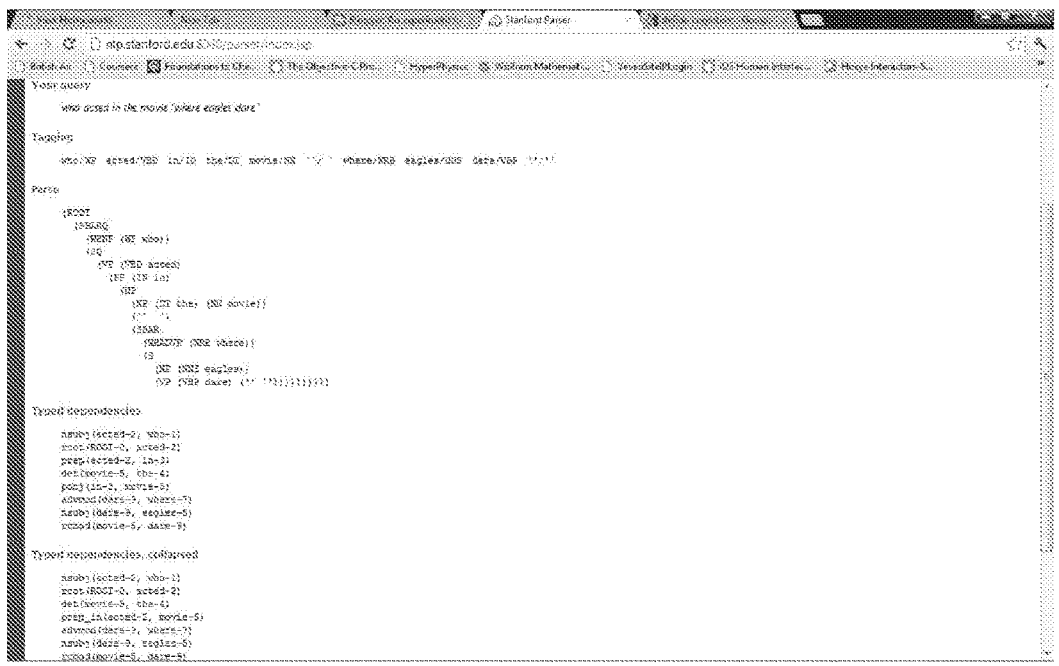
FIG. 2 illustrates a parser output when dealing punctuation that is present.
Figure 3:
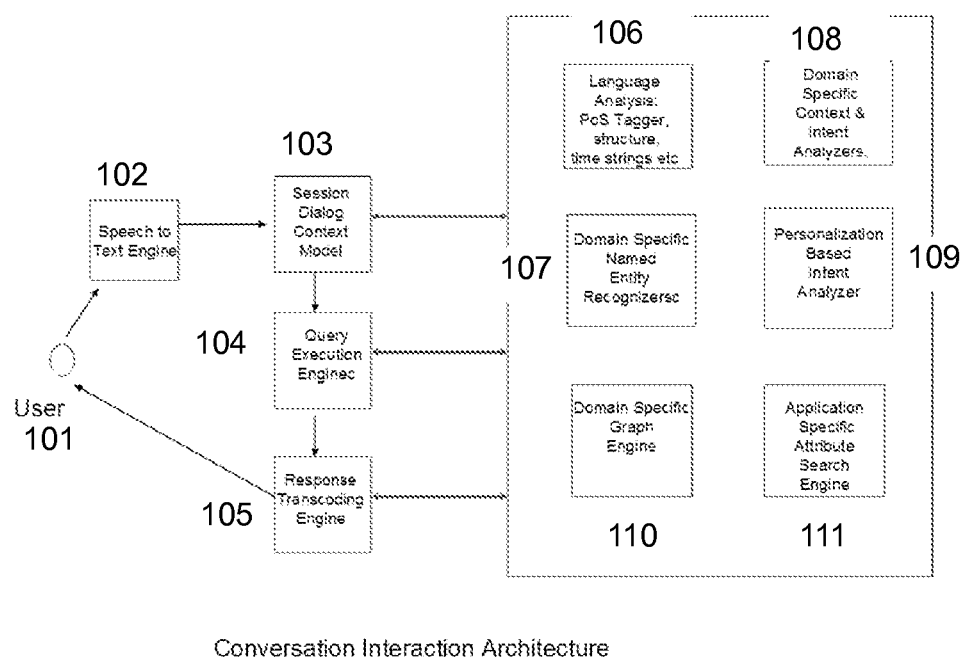
FIG. 3 illustrates an architecture for implementing an embodiment of the present invention.

FIG. 3 represents the overall system architecture on which embodiments of the present invention can be implemented for information retrieval using speech input. User 101 speaks his/her question that is fed to a speech to text engine 102. The speech to text engine outputs recognized words and pauses in the following illustrative canonical format, words interleaved with pauses (square braces indicating they are optional) measured in some unit of time, for example milliseconds.

[<pause duration=$x_1$ ms>] word$_1$ [<pause duration=$x_2$ ms>] word$_2$

[<pause duration=$x_3$ ms>] . . . word$_n$ [<[pause duration=$x_4$ ms>]

The text form of the user input is fed to session dialog content module 103. This module plays the role of maintaining state across conversation, a key use of which is to help in understanding user intent during a conversation, as described below. The session dialog, in conjunction with a language analyzer (or part of speech tagger) 106, and the other entity recognizer modules described below, breaks down the sentence into its constituent parts that can be broadly categorized as (1) intents—the actual intent of the user, such as: find a movie, play a song, tune to a channel, respond to an email, etc. (2) entities—noun or pronoun phrases describing the intent and (3) attributes (filters)—qualifiers to entities such the "latest" movie, "less" violence etc.

These classifications make use of the pauses present in the output of speech to text engine 102, to identify phrase and word boundaries. They also make use of the pauses to determine certain aspects of the user input, as a whole. For example, the system can use the pauses to determine the confidence of the user in the word or phrase about to be uttered. In an embodiment of the invention, the user's pauses at certain positions are inferred as cognitive recall latencies or sentence construction latencies. In response, the system returns with suggestions that are passively displayed to the user or generated as synthesized speech that interjects to offer him/her the suggestion. In the case of active interjection, the system avoids the self-reference issue of feeding back system-generated speech as input.

Another way in which the system can use pauses is to infer that clipping has occurred. For example, if the user's speech input is not flanked by pauses, then the system infers their absence as clipping and interprets the input accordingly. For front end clipping, the first word is interpreted as (1) a suffix to a word in addition to (2) an independent word. Similarly, the absence of a pause at the tail end of speech input is inferred as tail end clipping and the last word is interpreted (1) as a prefix to a word and (2) an independent word. The multiple interpretations of the entire phrase are then compared using the multiple meanings of the potentially clipped words, and the more likely construction is used as the user input. An alternate strategy is to process all possible meanings of the phrase and return all search results, with the results being ordered according to criteria in which results of likely higher interest to the user are ranked more highly.

In an embodiment of the invention, the speech to text engine would also send raw text mapping of sounds that did not map to words—this is useful in the case where the clipped words in the beginning and end do not themselves map to any words, which can lead to the speech-to-text engine dropping them form the input. The invention also factors in the possibility, when a pause flanking the input is lacking, that the first and last words could be words that phonetically matched clipped user input and performs prefix and suffix searches factoring this into account. In this usage, "prefix" and "suffix" mean the first incomplete portion of a word or the last incomplete portion of a word, respectively.

In the context of the goal of providing an intelligent and meaningful conversation, the intent is perhaps the key among all three categories. Any good search engine can perform an information retrieval task fairly well just by extracting the entities from a sentence—without understanding the grammar or the intent. For instance, given the following user question: "Can my daughter watch Pulp Fiction with me?" most search engines would show a link for the movie Pulp Fiction. While the link may lead to a source of further information about the movie as a whole (which may contain rating information), that type of response has failed to directly answer the user's question. In a conversational interface, the expectation is clearly higher—the system must ideally understand the (movie, rating) intent corresponding to the expected response of providing the rating of the movie and the age group it is appropriate for.

A conversational interface response degenerating to that of a search engine is tantamount to a failure of the system from a user perspective. Intent determination, and even more importantly, responding to user's question in a manner that appears closer to a human's response when the intent is not known or clearly discernible, is key for a conversational interface that strives to be closer to human interaction than to a mere search engine. To that end, intent analyzer 108 is a domain specific module that analyzes and classifies intent for a domain and works in conjunction with other modules—domain specific entity recognizer 107, personalization based intent analyzer 109, which classifies intent based on user's personal preferences, and the domain specific graph engine 110. The attribute specific search engine 111 assists in recognizing attributes, and their weights influence the entities they qualify. While FIG. 3 is a illustrative architecture for a conversational interface system showing the modules for a specific domain, embodiments of the present invention include multiple instances of the elements that are specific to the particular domains. Thus, implementations of the invention receive the user's input and engage in a dialog in which the user's intent can span domains. The aspect of processing the user's input across multiple domains and scoring the intent weights across those domains enable the system to better determine user's intent.

Speech Disfluency Detection and Usage

Figure 4:
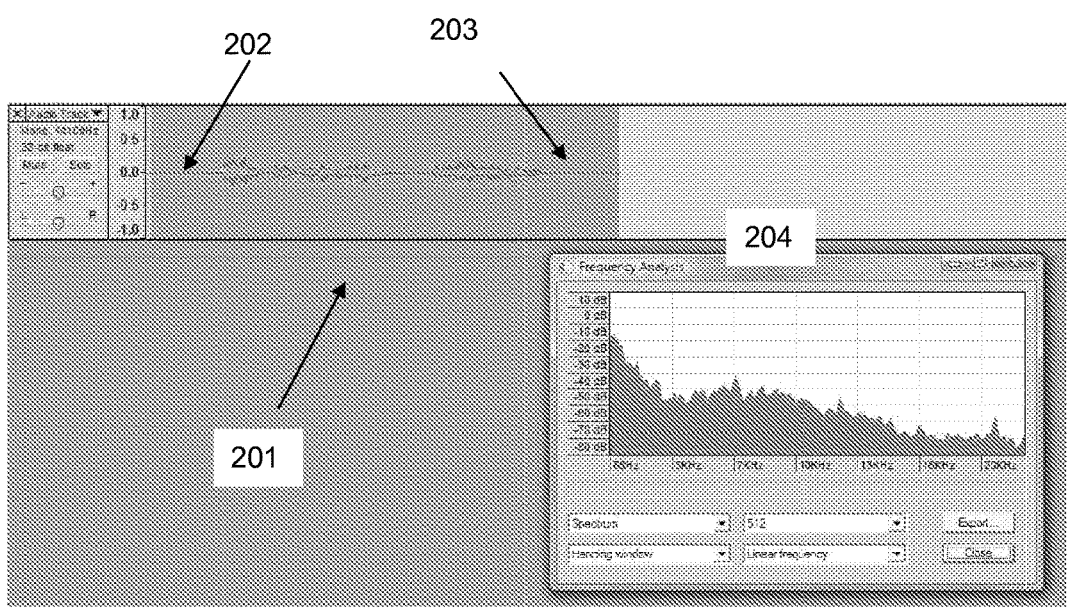
FIG. 4 illustrates waveform for a speech input indicating pauses within a speech input and pauses flanking the input.
Figure 5:
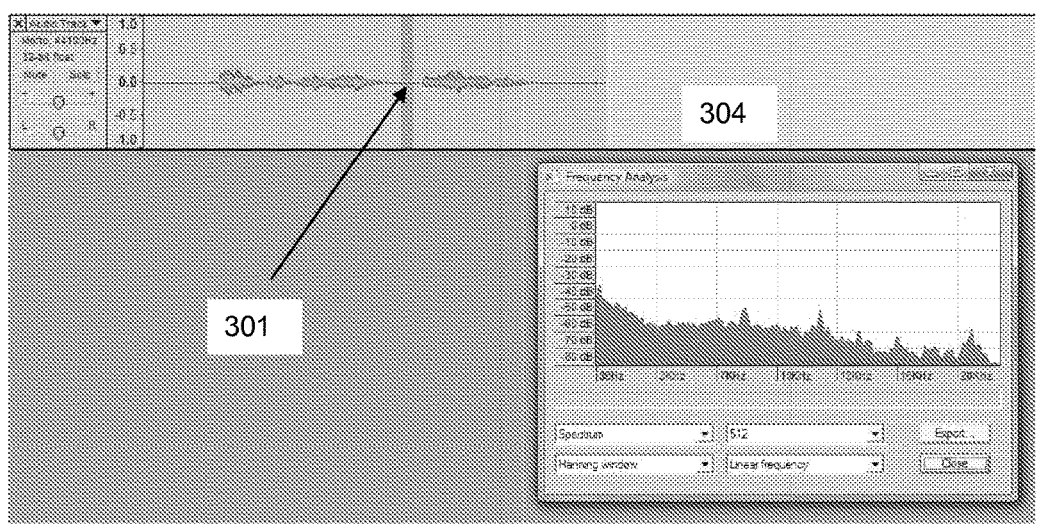
FIG. 5 illustrates waveform for a speech input highlighting a pause within a speech input.
Figure 6:
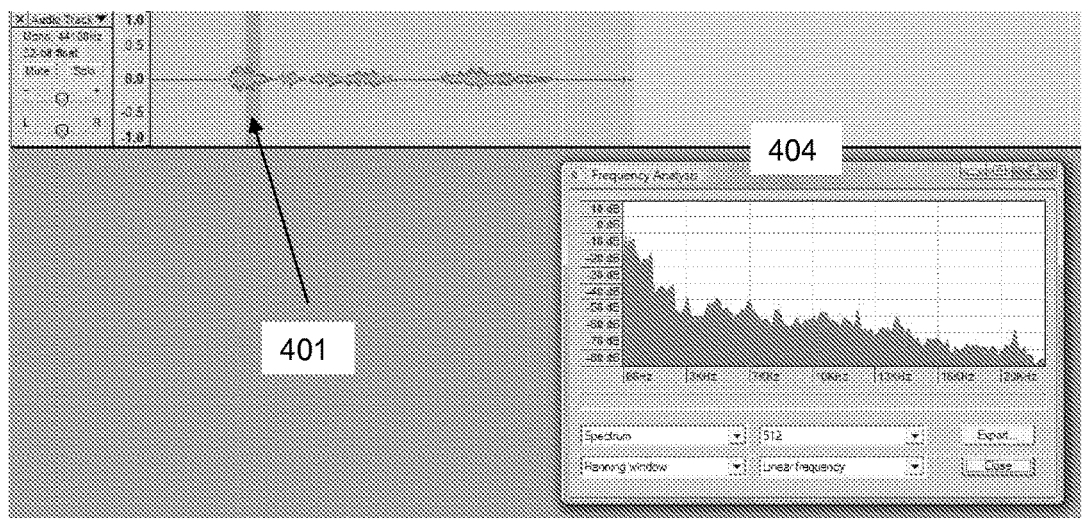
FIG. 6 illustrates waveform for a speech input highlighting a non-silence portion of a speech input.

FIGS. 4-6 illustrate a waveform sample for the user input "Who acted in the movie Tomorrow Never Dies?"

<pause duration=800 ms>who acted in the movie<pause duration=550 ms>tomorrow never dies<pause duration=1200 ms>

The speech input 201 is flanked by front-end pause/silence 202 and tail-end pauses/silence 203. In addition, within the speech input, there is a pause 301 for 550 milliseconds. These pauses/silence are indicated by low intensity of the speech input sound wave. Unlike these pauses, speech portion 401 has a high intensity, indicating that the portion is not a pause. One meaning of the term pause, as used herein, is a period of relative silence when user is not speaking, but the audio input may include ambient sounds. For example, frequency—power spectrums 204, 304, and 404 may be analyzed by the system to detect speech versus pause according to the input power levels. As shown in power spectrums 304 and 404, pause 301 has an intensity of about −60 dB, and speech portion 401 has an intensity of about −50 dB. Since the unit decibel is a logarithmic unit, there is about a factor of 10 difference in the intensity of the pause and the speech portion. The detection of pauses can be done by standard speech-to-text engines, taking into account ambient sounds.

As illustrated above, a pause is detected when there is a period with an absence of or a low intensity of sound. The cut-off intensity of sound to distinguish a pause from a vocalized portion of speech input can be predefined, for example, at −55 dB. On the other hands, the cut-off intensity can be relative to the speech input and the background noise. The cut-off intensity can be chosen, for example, at 20% of the average intensity of the speech input. If background noise is high, the cut-off intensity can be chosen at 30% of the average intensity. Also, the minimum pause period of a low sound intensity which constructs a pause may be predefined. For example, the minimum pause period can be 300 ms. Alternatively, the minimum pause period can vary depending on the speed at which the user speaks. If the speech input is spoken fast, the minimum pause period can be shorter, and if the speech input is spoken slow, the minimum pause period can be longer. Therefore, the system detects a pause when there is a period longer than the minimum pause period with a sound intensity smaller than the cut-off intensity.

Traditional speech-to-text engines may attempt to determine words and/or phrase based on the audio input during the pause, or may simply stop language processing during the pause. One distinction of the embodiments described herein is that the presently disclosed techniques include the fact that the pause occurred as input to the modules downstream of the speech-to-text engine for use in determining the user's intent or for helping the user form the query request itself. In addition to the use of pauses, other forms of speech disfluencies, including auditory time fillers, are used in speech processing. In the event user speaks additive filler words or sounds to accompany a pause, those filler words and sounds are recognized as pause additives by the downstream modules that process the output of the speech-to-text engine. For instance, use of filler words such as "like" followed by pause, or sounds such as "umm," "hmm," "well," "uh," and "eh" followed by pause are also considered collectively as a pause with the overall pause duration including the duration of utterance of the filler words. In other embodiments, auditory filler words may not be followed by a pause. Typically, auditory time fillers are continuous and lacks variations in tone and volume. These characteristics may aid the detection of auditory time fillers.

If the user's speech input, on the other hand, was "Is there a Red Sox game tomorrow?", there is unlikely to be a cognitive recall latency preceding the word "tomorrow" because the occurrence of the "tomorrow" is part of the very reason for asking the question. In contrast, during the speech input "Who acted in (pause) Tomorrow Never Dies?" user may pause before "tomorrow" to consciously demarcate the phrase boundary (i.e., to identify the portion of the phrase "Tomorrow Never Dies" as a distinct item) or just pause to perform cognitive recall. By using the pause preceding the phrase "Tomorrow Never Dies" to identify it as an item, the information retrieval system can better understand that the user's intent involves that item. This valuable piece of information can be used to constrain the search to information involving only that item, or items that are returned by the search that are related to the movie "Tomorrow Never Dies" can be given a higher relevance weight.

In the case of demarcating the phrase boundary, the user may confidently speak the portion following the pause. So the system can determine the portion following the pause as a certain phrase or title based on the loudness or speed of the speaker's voice. Another method to distinguish whether the portion following the pause is a confident phrase or an uncertain phrase can be based on a further utterance following the initial pause. If a person is uncertain about a phrase, he or she may engage in another pause. Also, a pause followed by a confident phrase may be relatively short. So the system may first assume that a phrase or title following a short pause is a confident phrase. Then, the system performs a search, but if the system does not find any result, the system may infer that the phrase following the short pause is uncertain.

As mentioned above, the presence of a pause within the speech input can be used as a confidence measure of portions of the input itself. The interpretation of the duration of pauses and their frequency of occurrence is also factored in by embodiments of the present invention to distinguish the cases of user just speaking slowly (so that speech recognition may work better) versus pausing to perform cognitive recall. For example, assume the user speech input was "Who acted in (pause) The Day Never Dies?" In this case, the system can use the pause to indicate that the user may be uncertain of the name of the item for which he/she is requesting information. Thus, when the system does not find an item corresponding to "The Day Never Dies", the system can respond with questions, guided by the user input (using, e.g., techniques set forth in the incorporated applications) in order to help the user define his/her intent.

In addition, the system could place lower search priority on the low confidence item as a whole and, instead, use the high confidence items to guide the search. For example, the system can place high confidence on the portion "Who acted in" in order to focus on results from an audio/video entertainment domain (based on the word "acted"). Knowing this domain, the system can further refine the search based on portions of the low confidence input. For example, the system can perform queries based on combinations of the words of the low confidence portion in order to find what the user is looking for or to at least provide some options to the user. Thus, the system may respond with a statement that it cannot find a movie "The Day Never Dies" and inquire if the user meant "Love Never Dies" or "Tomorrow Never Dies".

Figure 7:
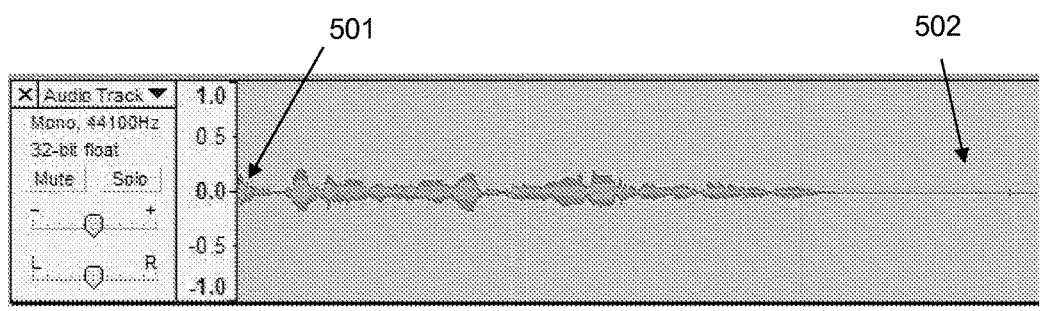
FIG. 7 illustrates waveform for a speech input with the beginning of the input being clipped.
Figure 8:
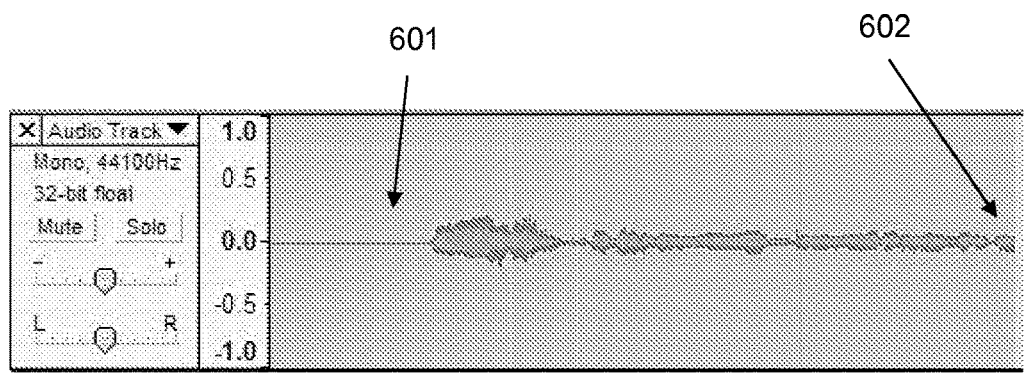
FIG. 8 illustrates waveform for a speech input with the tail end of the input being clipped.

FIGS. 7-8 illustrate waveforms exhibiting the use of the lack of pauses to detect clipping in speech input. Specifically, FIG. 7 shows a front-end clipping and FIG. 8 shows a tail-end clipping. Front-end clipping 501 and tail end clipping 602 are detected by the speech-to-text engine in conjunction with the other modules and encoded along with speech input as illustrated above. In contrast, the presence of tail end pause 502 and front-end pause 601 clearly demarcate the speech input. Traditional speech-to-text engines may map clipped sounds to approximately matching words or just emit phonetic text equivalent of sounds. Implementations of the present invention recognize the absence of these flanking pauses and use their presence as additional information for interpreting the meaning of user input. For example, rather than merely finding the word that most closely matches the clipped portion 501, the illustrative embodiment considers the possibility that a different word, having a matching suffix, was intended by the user.

Information Repositories Applicable to Embodiments of the Present Invention

In some embodiments, the present invention can use information repositories to search the query result or to find a substitute word or phrase. Information repositories are associated with domains, which are groupings of similar types of information and/or certain types of content items. Certain types of information repositories include entities and relationships between the entities. Each entity/relationship has a type, respectively, from a set of types. Furthermore, associated with each entity/relationship are a set of attributes, which can be captured, in some embodiments, as a defined finite set of name-value fields. The entity/relationship mapping also serves as a set of metadata associated with the content items because the entity/relationship mapping provides information that describes the various content items. In other words, a particular entity will have relationships with other entities, and these "other entities" serve as metadata to the "particular entity". In addition, each entity in the mapping can have attributes assigned to it or to the relationships that connect the entity to other entities in the mapping. Collectively, this makes up the metadata associated with the entities/content items. In general, such information repositories are called structured information repositories. Examples of information repositories associated with domains follow below.

A media entertainment domain includes entities, such as, movies, TV-shows, episodes, crew, roles/characters, actors/personalities, athletes, games, teams, leagues and tournaments, sports people, music artists and performers, composers, albums, songs, news personalities, and/or content distributors. These entities have relationships that are captured in the information repository. For example, a movie entity is related via an "acted in" relationship to one or more actor/personality entities. Similarly, a movie entity may be related to an music album entity via an "original sound track" relationship, which in turn may be related to a song entity via a "track in album" relationship. Meanwhile, names, descriptions, schedule information, reviews, ratings, costs, URLs to videos or audios, application or content store handles, scores, etc. may be deemed attribute fields.

A personal electronic mail (email) domain includes entities, such as, emails, email-threads, contacts, senders, recipients, company names, departments/business units in the enterprise, email folders, office locations, and/or cities and countries corresponding to office locations. Illustrative examples of relationships include an email entity related to its sender entity (as well as the to, cc, bcc, receivers, and email thread entities.) Meanwhile, relationships between a contact and his or her company, department, office location can exist. In this repository, instances of attribute fields associated with entities include contacts' names, designations, email handles, other contact information, email sent/received timestamp, subject, body, attachments, priority levels, an office's location information, and/or a department's name and description.

A travel-related/hotels and sightseeing domain includes entities, such as, cities, hotels, hotel brands, individual points of interest, categories of points of interest, consumer facing retail chains, car rental sites, and/or car rental companies. Relationships between such entities include location, membership in chains, and/or categories. Furthermore, names, descriptions, keywords, costs, types of service, ratings, reviews, etc. all amount of attribute fields.

An electronic commerce domain includes entities, such as, product items, product categories and subcategories, brands, stores, etc. Relationships between such entities can include compatibility information between product items, a product "sold by" a store, etc. Attribute fields in include descriptions, keywords, reviews, ratings, costs, and/or availability information.

An address book domain includes entities and information such as contact names, electronic mail addresses, telephone numbers, physical addresses, and employer.

The entities, relationships, and attributes listed herein are illustrative only, and are not intended to be an exhaustive list.

Embodiments of the present invention may also use repositories that are not structured information repositories as described above. For example, the information repository corresponding to network-based documents (e.g., the Internet/World Wide Web) can be considered a relationship web of linked documents (entities). However, in general, no directly applicable type structure can meaningfully describe, in a nontrivial way, all the kinds of entities and relationships and attributes associated with elements of the Internet in the sense of the structured information repositories described above. However, elements such as domain names, internet media types, filenames, filename extension, etc. can be used as entities or attributes with such information.

For example, consider a corpus consisting of a set of unstructured text documents. In this case, no directly applicable type structure can enumerate a set of entities and relationships that meaningfully describe the document contents. However, application of semantic information extraction processing techniques as a pre-processing step may yield entities and relationships that can partially uncover structure from such a corpus.

Illustrative Examples of Accessing Information Repositories Under Certain Embodiments of the Present Invention The following description illustrates examples of information retrieval tasks in the context of structured and unstructured information repositories as described above.

In some cases, a user is interested in one or more entities of some type—generally called intent type herein—which the user wishes to uncover by specifying only attribute field constraints that the entities must satisfy. Note that sometimes intent may be a (type, attribute) pair when the user wants some attribute of an entity of a certain type. For example, if the user wants the rating of a movie, the intent could be viewed as (type, attribute)=(movie, rating). Such query-constraints are generally called attribute-only constraints herein.

Whenever the user names the entity or specifies enough information to directly match attributes of the desired intent type entity, it is an attribute-only constraint. For example, when the user identifies a movie by name and some additional attribute (e.g., 'Cape Fear' made in the 60s), or when he specifies a subject match for the email he wants to uncover, or when he asks for hotels based on a price range, or when he specifies that he wants a 32 GB, black colored iPod touch.

However, in some cases, a user is interested in one or more entities of the intent type by specifying not only attribute field constraints on the intent type entities but also by specifying attribute field constraints on or naming other entities to which the intent type entities are connected via relationships in some well defined way. Such query-constraints are generally called connection oriented constraints herein.

An example of a connection oriented constraint is when the user wants a movie (an intent type) based on specifying two or more actors of the movie or a movie based on an actor and an award the movie won. Another example, in the context of email, is if the user wants emails (intent type) received from certain senders from a particular company in the last seven days. Similarly, a further example is if the user wants to book a hotel room (intent type) to a train station as well as a Starbucks outlet. Yet another example is if the user wants a television set (intent type) made by Samsung that is also compatible with a Nintendo Wii. All of these are instances of connection oriented constraints queries.

In the above connection-oriented constraint examples, the user explicitly describes or specifies the other entities connected to the intent entities. Such constraints are generally called explicit connection oriented constraints and such entities as explicit entities herein.

Meanwhile, other queries contain connection oriented constraints that include unspecified or implicit entities as part of the constraint specification. In such a situation, the user is attempting to identify a piece of information, entity, attribute, etc. that is not know through relationships between the unknown item and items the user does now. Such constraints are generally called implicit connection oriented constraints herein and the unspecified entities are generally called implicit entities of the constraint herein.

For example, the user may wish to identify a movie she is seeking via naming two characters in the movie. However, the user does not recall the name of one of the characters, but she does recall that a particular actor played the character. Thus, in her query, she states one character by name and identifies the unknown character by stating that the character was played by the particular actor.

However consider the following user constraints for specific information retrieval goals: The user wants the role (intent) played by a specified actor (e.g., 'Michelle Pfeiffer') in an unspecified movie that is about a specified role (e.g., the character 'Tony Montana'.) In this case the user's constraint includes an unspecified or implicit entity which corresponds to the movie 'Scarface.' Similarly, suppose that the user wants the movie (intent) starring the specified actor 'Scarlett Johannsen' and the unspecified actor who played the specified role of 'Obe Wan Kanobi' in a specified film 'Star Wars.' In this case the implicit entity is the actor 'Ewan McGregor' and the intent entity is the movie 'The Island' starring 'Scarlett Johannsen' and 'Ewan McGregor'.

In the context of email repository, an example includes a user wanting to get the last email (intent) from an unspecified gentleman from a specified company 'Intel' to whom he was introduced via email (an attribute specifier) last week. In this case, the implicit entity is a contact who can be discovered by examining contacts from 'Intel', via an employee/company relationship, who was a first time common-email-recipient with the user last week.

The above three examples are connection oriented constraints but they include unspecified or implicit entities as part of the constraint specification—We call such constraints implicit connection oriented constraints and call the unspecified entities as implicit entities of the constraint.

In the context of connection oriented constraints, it is useful to basically map entities and relationships of information repositories to nodes and edges of a graph. The motivation for specifically employing the graph model in lieu of the entity relationship model is the observation that relevance, proximity and relatedness in natural language conversation can be modeled simply by notions such as link-distance and in some cases shortest paths and smallest weight trees. During conversation when a user dialog involves other entities related to the actually sought entities, a subroutine addressing information retrieval as a simple graph search problem effectively helps reducing dependence on deep unambiguous comprehension of sentence structure, which can be a huge implementation benefit. Even if user intent calculation is ambiguous or inconclusive, so long as entities have been recognized in the user utterance, a graph-interpretation based treatment of the problem enables our system to respond in a much more intelligible manner than otherwise possible.

Some embodiments of the present invention use the signature of user preferences (which captures user activity and interests, both implicitly and explicitly determined) in a context dependent manner and, if applicable, applies personalization to selection of a word preceded by a pause or a clipped word in case of front-end clipping and tail-end clipping. Personalization can also be applied to result selection to offer the best response that has a high likelihood of matching user's intent. Certain embodiments of the present invention use the signature of user preferences, if available, to resolve ambiguity in user's input.

A user preference signature can be provided by the system using known techniques for discovering and storing such user preference information. For example, the methods and systems set forth in U.S. Pat. No. 7,774,294, entitled Methods and Systems for Selecting and Presenting Content Based on Learned Periodicity of User Content Selections, issued Aug. 10, 2010, U.S. Pat. No. 7,835,998, entitled Methods and Systems for Selecting and Presenting Content on a First System Based on User Preferences Learned on a Second System, issued Nov. 16, 2010, U.S. Pat. No. 7,461,061, entitled User Interface Methods and Systems for Selecting and Presenting Content Based on User Navigation and Selection Actions Associated with the Content, issued Dec. 2, 2008, and U.S. Pat. No. 8,112,454, entitled Methods and Systems for Ordering Content Items According to Learned User Preferences, issued Feb. 7, 2012, each of which is incorporated by reference herein, can be used with the techniques disclosed herein. However, the use of user's preference signatures and/or information is not limited to the techniques set forth in the incorporated applications.

The techniques and systems disclosed herein may be implemented as a computer program product for use with a computer system or computerized electronic device. Such implementations may include a series of computer instructions, or logic, fixed either on a tangible medium, such as a computer readable medium (e.g., a diskette, CD-ROM, ROM, flash memory or other memory or fixed disk) or transmittable to a computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Moreover, the techniques and systems disclosed herein can be used with a variety of mobile devices. For example, mobile telephones, smart phones, personal digital assistants, and/or mobile computing devices capable of receiving the signals discussed herein can be used in implementations of the invention.

The various aspects and embodiments of the invention can be used in conjunction with the techniques set forth in the following patents and applications, all of which are incorporated by reference herein:

U.S. Pat. No. 7,895,218, entitled "Method and System for Performing Searches for Television Content Using Reduced Text Input", issued Feb. 22, 2011;
  U.S. Provision Application No. 61/673,867, entitled "A Conversational Interaction System for Large Corpus Information Retrieval", filed Jul. 20, 2012; and
  U.S. Provision Application No. 61/677,895, entitled "Disambiguating User Intent in Conversational Interaction System for Large Corpus Information Retrieval", filed Jul. 31, 2012.

As will be apparent to one of ordinary skill in the art from a reading of this disclosure, the present disclosure can be embodied in forms other than those specifically disclosed above. The particular embodiments described above are, therefore, to be considered as illustrative and not restrictive. Those skilled in the art will recognize, or be able to ascertain, using no more than routine experimentation, numerous equivalents to the specific embodiments described herein. The scope of the invention is as set forth in the appended claims and equivalents thereof, rather than being limited to the examples contained in the foregoing description.

What is claimed is:

1. A method for using speech disfluencies detected in speech input to assist in interpreting the input, the method comprising:
   providing access to a set of content items, each of the content items being associated with metadata that describes the corresponding content item;
   receiving a speech input from a user, the input intended by the user to identify at least one desired content item;
   detecting a speech disfluency in the speech input;
   computing a first search priority for a first portion of the speech input following the speech disfluency and a second search priority for a second portion of the speech input preceding the speech disfluency, wherein each of the first search priority and the second search priority is computed based on a measure of the disfluency;
   in response to determining that the first search priority is less than the second search priority, determining whether the first search priority is lower than a threshold minimum search priority;
   in response to determining that the first search priority is lower than the threshold minimum search priority, determining an alternative query input by automatically replacing the first portion of the speech input following the speech disfluency with another word or phrase;
   selecting a subset of content items from the set of content items based on comparing the speech input, the alternative query input, and the metadata associated with the subset of content items; and
   presenting the subset of content items to the user.

2. The method of claim 1, wherein the speech disfluency is a pause or an auditory time filler.

3. The method of claim 1, further comprising providing a user preference signature, the user preference signature describing preferences of the user for at least one of (i) particular content items and (ii) metadata associated with the content items, wherein each of the content items is associated with metadata that describes the corresponding content items and wherein the first portion of the speech input that is replaced is selected based on the user preference signature.

4. A method for using speech disfluencies detected in speech input to assist in interpreting the input, the method comprising:
   providing access to a set of content items, each of the content items being associated with metadata that describes the corresponding content item;
   receiving a speech input from a user, the input intended by the user to identify at least one desired content item;
   detecting a pause in the speech input, wherein the pause is a period of silence, and wherein the detecting comprises:
   identifying a start time when a sound intensity of the speech input decreases to a first value that is below a threshold cut-off intensity;
   identifying an end time when the sound intensity of the speech input increases to a second value that is greater than a threshold cut-off intensity; and
   computing a duration of the pause in the speech input based on a difference between the end time and the start time;
   in response to determining that the duration of the pause is less than a threshold minimum duration, assigning a higher weight to a first portion of the speech input following the pause than a second portion of the speech input preceding the pause;
   selecting a subset of content items based on the assigned weight by comparing the speech input and the metadata associated with the subset of content items; and
   presenting the subset of content items to the user.

5. The method of claim 4, further comprising inferring that the portion of the speech input following the pause is a title or a common phrase.

6. The method of claim 4, wherein detecting the pause further comprises:
   comparing the sound intensity of the speech input to the threshold cut-off intensity;
   determining, based on the comparing, that the sound intensity of the speech input is less than the threshold cut-off intensity;
   determining a length of time for which the sound the sound intensity of the speech input is less than the threshold cut-off intensity;
   comparing the length of time to a minimum pause period; and
   determining that the length of time exceeds the minimum pause period.

7. The method of claim 6, wherein the minimum pause period is associated with a speed of the speech input.

8. The method of claim 6, wherein the threshold cut-off intensity is determined based on an average sound intensity of the speech input and a sound intensity of background noise.

9. A system for using speech disfluencies detected in speech input to assist in interpreting the input, the system comprising control circuitry configured to:
   provide access to a set of content items, each of the content items being associated with metadata that describes the corresponding content item;
   receive a speech input from a user, the input intended by the user to identify at least one desired content item;
   detect a speech disfluency in the speech input;
   compute a first search priority for a first portion of the speech input following the speech disfluency and a second search priority for a second portion of the speech input preceding the speech disfluency, wherein each of the first search priority and the second search priority is computed based on a measure of the disfluency;
   in response to determining that the first search priority is less than the second search priority, determine whether the first search priority is lower than a threshold minimum search priority;
   in response to determining that the first search priority is lower than the threshold minimum search priority, determine an alternative query input by automatically replacing the first portion of the speech input following the speech disfluency with another word or phrase;
   select a subset of content items from the set of content items based on comparing the speech input, the alternative query input, and the metadata associated with the subset of content items; and
   present the subset of content items to the user.

10. The system of claim 9, wherein the speech disfluency is a pause or an auditory time filler.

11. The system of claim 9, wherein the control circuitry is further configured to provide a user preference signature, the user preference signature describing preferences of the user for at least one of (i) particular content items and (ii) metadata associated with the content items and wherein each of the content items is associated with metadata that describes the corresponding content items and wherein the first portion of the speech input that is replaced is selected based on the user preference signature.

12. A system for using speech disfluencies detected in speech input to assist in interpreting the input, the system comprising control circuitry configured to:
provide access to a set of content items, each of the content items being associated with metadata that describes the corresponding content item;
receive a speech input from a user, the input intended by the user to identify at least one desired content item;
detect a pause in the speech input, wherein the pause is a period of silence, and wherein the control circuitry configured to detect the pause in the speech input is further configured to:
identify a start time when a sound intensity of the speech input decreases to a first value that is below a threshold cut-off intensity;
identify an end time when the sound intensity of the speech input increases to a second value that is greater than a threshold cut-off intensity; and
compute a duration of the pause in the speech input based on a difference between the end time and the start time;
in response to determining that the duration of the pause is less than a threshold minimum duration, assign a higher weight to a first portion of the speech input following the pause than a second portion of the speech input preceding the pause;
select a subset of content items based on the assigned weight by comparing the speech input and the metadata associated with the subset of content items; and
present the subset of content items to the user.

13. The system of claim 12, wherein the control circuitry is further configured to infer that the portion of the speech input following the pause is a title or a common phrase.

14. The system of claim 12, wherein the control circuitry configured to detect the pause is further configured to cause the computer system to:
compare the sound intensity of the speech input to the threshold cut-off intensity;
determine, based on the comparing, that the sound intensity of the speech input is less than the threshold cut-off intensity;
determine a length of time for which the sound the sound intensity of the speech input is less than the threshold cut-off intensity;
compare the length of time to a minimum pause period; and
determine that the length of time exceeds the minimum pause period.

15. The system of claim 14, wherein the minimum pause period is associated with a speed of the speech input.

16. The system of claim 14, wherein the threshold cut-off intensity is determined based on an average sound intensity of the speech input and a sound intensity of background noise.

* * * * *